United States Patent
Park et al.

(10) Patent No.: US 10,811,733 B2
(45) Date of Patent: Oct. 20, 2020

(54) MODULAR TRAY FOR SECONDARY BATTERY CELL

(71) Applicant: LG CHEM, LTD., Seoul (KR)

(72) Inventors: Hyun Park, Daejeon (KR); Sang Baek Ryu, Daejeon (KR); Chan Ki Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/264,232

(22) Filed: Jan. 31, 2019

(65) Prior Publication Data

US 2019/0245251 A1     Aug. 8, 2019

(30) Foreign Application Priority Data

Feb. 6, 2018  (KR) .................. 10-2018-0014429

(51) Int. Cl.
*H01M 10/44*       (2006.01)
*H01M 2/10*        (2006.01)
*H01M 4/04*        (2006.01)

(52) U.S. Cl.
CPC ....... *H01M 10/446* (2013.01); *H01M 2/1016* (2013.01); *H01M 4/0447* (2013.01); *H01M 10/441* (2013.01)

(58) Field of Classification Search
None
See application file for complete search history.

(56) References Cited

U.S. PATENT DOCUMENTS

| | | | |
|---|---|---|---|
| 2012/0228946 A1 | 9/2012 | Sim et al. | |
| 2013/0008862 A1* | 1/2013 | Conrardy | H01M 2/1077 211/26 |
| 2017/0331078 A1* | 11/2017 | Schneider | H01M 2/0237 |

FOREIGN PATENT DOCUMENTS

| | | |
|---|---|---|
| JP | 2003-59543 A | 2/2003 |
| JP | 2014-216134 A | 11/2014 |
| KR | 10-2004-0026543 A | 3/2004 |
| KR | 10-2013-0023030 A | 3/2013 |
| KR | 10-2015-0082957 A | 7/2015 |
| KR | 10-2017-0100341 A | 9/2017 |

* cited by examiner

*Primary Examiner* — Carmen V Lyles-Irving
(74) *Attorney, Agent, or Firm* — Birch, Stewart, Kolasch & Birch, LLP

(57) ABSTRACT

A secondary battery cell module-type activation tray for transferring and charging a plurality of battery cells in a manufacturing process of a secondary battery, including a plurality of module trays that are embedded from one side opened to accommodate a plurality of battery cells in a plurality of rows to another side opposite thereto, the battery cells being disposed in a respective module tray, and each of the module trays has a structure that can be coupled or separated as extended in one direction or multiple directions in a plan view.

2 Claims, 6 Drawing Sheets

MODULAR TRAY FOR SECONDARY BATTERY CELL

TECHNICAL FIELD

The present invention relates to a modular activation tray including a module tray.

BACKGROUND ART

The demand for alternative or clean energy is increasing due to the rapid increase in the use of fossil raw materials, and the demand for environmentally friendly alternative energy sources is becoming an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for secondary batteries as energy sources is rapidly increasing, and accordingly, a lot of researches on batteries capable of meeting various demands have been conducted.

Typically, there is a high demand for a prismatic secondary battery and a pouch-type secondary battery that can be applied to a product requiring a small thickness and a high density of energy to be stored in a narrow space in terms of the shape of the battery. In terms of material, there is a high demand for lithium secondary batteries such as lithium ion batteries and lithium ion polymer batteries, which have advantages such as a high energy density, a high discharge voltage, and output stability.

The secondary battery is classified into a cylindrical battery and a prismatic battery in which an electrode assembly is embedded in a cylindrical or prismatic metal according to the shape of the battery case, and a pouch-shaped battery in which an electrode assembly is embedded in a pouch-shaped case of an aluminum laminate sheet.

The secondary battery is classified according to the structure of the positive electrode, the negative electrode, and the electrode assembly having the structure in which the separator interposed between the positive electrode and the negative electrode is laminated. Some examples thereof include a jelly-roll type (wound type) electrode assembly in which positive electrodes and negative electrodes of a long sheet type are wound with a separator interposed therebetween, and a stacked type electrode assembly in which a plurality of positive electrodes and negative electrodes cut in a predetermined size unit is sequentially stacked with a separator interposed therebetween. Further, recently, as an electrode assembly of the advanced structure, which is a mixture of the jelly-roll type and the stack type, a stack/folding type electrode assembly having a structure in which a predetermined unit of positive electrode and negative electrode are sequentially wound in a state that unit cells stacked with the separator interposed therebetween are located.

In recent years, a pouch type battery having a stack type or stack/folding type electrode assembly embedded in a pouch-shaped battery case of an aluminum laminate sheet has attracted a lot of attention due to its low manufacturing cost and small weight, and the amount used thereof is gradually increasing.

FIG. 1 is an exploded perspective view schematically showing the structure of a pouch-type battery cell. Referring to FIG. 1, a pouch-type battery cell 100 includes an electrode assembly 130, electrode tabs 131 and 132 extended from the electrode assembly 130, electrode leads 140 and 141 welded to the electrode tabs 131 and 132, and a battery case 120 that accommodates the electrode assembly 130.

The electrode assembly 130 is a power generation device in which a positive electrode and a negative electrode are sequentially stacked with a separator interposed therebetween. The electrode assembly 130 has a stack-type structure or a stack/folding-type structure. The electrode tabs 131 and 132 are extended from the respective electrode plates of the electrode assembly 130. The electrode leads 140 and 141 are electrically connected to the plurality of electrode tabs 131 and 132 extended from the respective electrode plates, for example, by welding, and part of the battery case 120 is exposed to the outside. An insulating film 150 is attached to a portion of the upper and lower surfaces of the electrode leads 140 and 141 in order to increase the degree of sealing with the battery case 120 and to secure an electrically insulated state.

The battery case 120 includes a case body 122 including a concave shaped accommodation part 123 on which the electrode assembly 130 can be seated and a lid 121 integrally connected to the case body 122, and the battery is completed by combining the both side parts 124 and an upper part 125, which are contact parts, in a state that the electrode assembly 130 is accommodated in the accommodation part 123. The battery case 120 is made of an aluminum laminate structure of a resin outer layer/barrier metal layer/heat-fusible resin sealant layer, and forms a sealing surplus portion by fusing a resin layer by applying heat and pressure to the mutually contacting lid 121 and the both side parts 124 and the upper part 125 of the body 122. The both side parts 124 are in direct contact with the same resin layers of the upper and lower battery cases 120, so that they can be uniformly sealed by melting. Since the electrode leads 140 and 141 protrude from the upper part 125, thermal fusion can be performed in a state that the insulating film 150 is interposed between the electrode leads 140 and 141 in order to enhance the sealing performance in consideration of the difference with the thickness of the electrode leads 140 and 141 and the material of the battery case 120.

In general, a pouch-type battery cell having such a structure is manufactured through various processes such as a process of preparing a primary battery cell having a structure in which an electrode assembly and an electrolyte are housed together in a battery case, an aging process for the primary battery cell, an activation process for charging and discharging the primary battery cell, and a degassing process of removing the gas generated in the aging process and the charge/discharge process.

At this time, the activation process proceeds by connecting a charge/discharge device to the positive electrode terminal and the negative electrode terminal of the battery cell in a state where the battery cell is housed in the battery cell activation tray so as to accommodate the battery cell.

FIG. 2 shows a photograph of a conventional battery cell activation tray. Herein, the battery cell activation tray is in the form of an injection mold, and basically three columns constitute one activation tray. In the conventional tray, when a defective battery cell is found, the battery cell activation tray is taken out, the defective cell is removed, and reinsertion is performed.

However, if the battery cell activation tray is taken out, the defective cell is removed, and reinsertion is performed for the activation process every time a defective cell is found in the battery cell activation tray, it requires the use of human power and it is economically inefficient to remove a defective battery cell even from an normal battery cell, which can reduce the efficiency of the activation process of the battery cell.

Therefore, there is a high need for a technology for fundamentally solving such problems.

DISCLOSURE

Technical Problem

It is an object of the present invention to solve the above-mentioned problems of the prior art and the technical problems required from the past.

The inventors of the present application have conducted intensive research and various experiments. As described later, the secondary battery cell module-type activation tray, in which the battery cells are mounted for transferring and charging the battery cells in the secondary battery manufacturing process, include a first module tray, a second module tray, and a third module tray, and each of the module trays has a structure in which adjacent module trays extend in one direction or both directions in the plane so as to be coupled or detachable. As such, when a defective battery cell is found in any one module tray in the activation tray, it is possible to remove the specific module tray in which the defective battery cell is found, resulting in a reduction in labor consumption and an increase in the efficiency of the activation process of the battery cell.

Technical Solution

In order to achieve the above objects, there is provided a secondary battery cell module-type activation tray for transferring and charging a plurality of battery cells in a manufacturing process of a secondary battery, the activation tray including: a first module tray recessed from one surface opened to accommodate a plurality of the battery cells in a plurality of rows to another surface opposite thereto; a second module tray recessed in from the one surface opened to accommodate a plurality of the battery cells in a plurality of rows to another surface opposite thereto; and a third module tray recessed from the one surface opened to accommodate a plurality of the battery cells in a plurality of rows to another surface opposite thereto, wherein each of the battery cells are disposed within a respective one of the module trays, and wherein the first module tray, the second module tray, and the third module tray are configured to extend in one direction or multiple directions on a plane so as to be engageable or detachable with each other.

Further, it is possible that the lower surface of the electrode terminal of the battery cell is arranged to face the ground, or to face the opposite direction of the ground.

Therefore, since the activation tray used in the activation process of the battery cells is constituted by a plurality of module trays, and each module tray has a structure that can be coupled or separated in a plane, the user can easily and freely move the position and order and thus it is possible to perform the activation process more effectively and easily.

Generally, in the case of lithium secondary batteries such as a lithium ion battery and a lithium polymer battery, which are widely used in recent years, the process of performing a predetermined charge and discharge after the preparation, that is, a conversion process, should be performed to complete the performance of the battery cell.

In addition, the battery cell has a positive electrode/ separator/negative electrode structure in which an electrode assembly is sealed together with an electrolyte in a pouch-type case. The battery cell may have a rectangular plate-shaped structure. In more detail, the plate-shaped battery cell may have a rectangular shape having a pair of long sides and a pair of short sides in a plan view, and a plate-shaped positive electrode terminal and a negative electrode terminal may be formed on one side or both sides of the battery cell.

In one specific example, the secondary battery cell module-type activation tray may be composed of three or more module trays.

Therefore, by using three or more module trays, it becomes possible to carry out the battery cell activation process in a large amount. Most preferably, however, three module trays constitute one activation tray.

In another specific example, when a defective battery cell is found in one of the module trays of the activation tray, the module tray having the defective battery cell may be separated and removed, and the activation tray may be composed of two module trays.

At this time, the secondary battery cell module-type activation tray may further include a fourth module tray, so that it can be composed of three module trays.

Therefore, when three module trays constitute one activation tray, if the module tray, in which a defective battery cell is found, is removed, the remaining module trays may be one or two, and when there are two remaining module trays, the activation process of the activation tray composed of two module trays can be carried out by separating and combining the module trays. If the remaining module tray is one, it can be coupled to the activation tray composed of two module trays.

In this manner, when a defective battery cell found in each of the module trays of the activation tray, the related module tray is removed, and the remaining module trays can be continually perform the activation process, thereby increasing the efficiency of the activation process of the battery cell and, particularly saving time and cost for removing and replacing defective battery cells in the subsequent characteristic process. In addition, there is an advantage that safety can be ensured by preventing activation of defective battery cells.

In one specific example, each of the module trays includes a first sidewall, a second sidewall, a third sidewall and a fourth sidewall formed to extend along the outer periphery of the tray base plate, and the module tray can be assembled through the sidewalls.

Here, the sidewall of the module trays may have a prefabricated fastening structure which is mutually engageable.

Specifically, the first sidewall of each of the module trays forms a groove having a concave shape extending outwardly, and the third sidewall forms a protrusion having a convex shape extending outwardly, to thereby form a slide fastening structure in which adjacent module trays are engageable and separable. Alternatively, each first sidewall forms a protrusion having a convex shape extending outwardly, and each third sidewall forms a groove having a concave shape extending outwardly, to thereby form a slide fastening structure in which adjacent module trays are engageable and separable.

In the present invention, the first and third sidewalls are formed by protrusions and grooves, and the module trays are coupled and separated by a structure in which they can slide. However, the present invention is not limited thereto. If the sidewalls have a prefabricated fastening structure which can be mutually coupled, the assembly between module trays is possible.

Therefore, when the module tray is to be removed through the coupling or separation, it is possible to easily engage and separate due to the prefabricated fastening structure of the sidewall, so that a stable activation process can be performed and a stable coupling force can be exhibited.

In the present invention, the charging and discharging device of the secondary battery is capable of combining, assembling, or removing the module tray that automatically constitutes the activation tray.

In another specific example, the battery cell may have a structure in which an electrode assembly having a positive electrode, a negative electrode, and a separator interposed between the positive electrode and the negative electrode is sealed in an electrode case.

The positive electrode, for example, may be prepared by applying a mixture of a positive electrode active material, a conductive material and a binder on a positive electrode current collector, followed by drying. If necessary, a filler may be further added to the mixture.

The positive electrode active material is a lithium transition metal oxide, which includes two or more transition metals, for example, lithium cobalt oxide ($LiCoO_2$) substituted with one or more transition metals, layered compounds such as nickel oxide ($LiNiO_2$); lithium manganese oxide substituted with one or more transition metals; lithium nickel oxide expressed as chemical formula $LiNi_{1-y}M_yO_2$ (herein, M is at least one element selected from the group consisting of Co, Mn, Al, Cu, Fe, Mg, B, Cr, Zn and Ga, $0.01 \leq y \leq 0.7$); lithium nickel cobalt manganese compound oxide expressed as $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ and $Li_{1+z}Ni_{0.4}Mn_{0.4}Co_{0.2}O_2$ (herein, $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$; M=Al, Mg, Cr, Ti, Si or Y; and A=F, P or Cl); olivine-based lithium metal phosphate expressed as chemical formula $Li_{1+x}M_{1-y}M'_yPO_{4-z}X_z$ (herein, M=transition metal, preferably Fe, Mn, Co or Ni; M'=Al, Mg or Ti; X=F, S or N; and $-0.5 \leq x \leq +0.5$, $0 \leq y \leq 0.5$, $0 \leq z \leq 0.1$), but the present invention is not limited to these examples.

The conductive material is usually added in an amount of 1 to 20% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

Further, the negative electrode, for example, may be prepared by applying a mixture of a negative electrode active material, a conductive material and a binder on a negative electrode current collector, followed by drying. If necessary, a filler may be further added to the mixture.

Further, the negative electrode active material may be at least one selected from the group consisting of graphite carbon, coke carbon, and hard carbon.

In one specific example, the secondary battery cell module-type activation tray is capable of stacking one or more module-type activation trays in a direction perpendicular to the ground.

Accordingly, as the activation trays are stacked in the vertical direction, a plurality of activation trays can simultaneously perform the activation process, thereby increasing the process efficiency and exhibiting economic effects.

The present invention also provides a secondary battery, which is manufactured using the secondary battery cell module-type activation tray.

Further, the present invention can provide a battery pack including the secondary battery, and a device including the battery pack, and some examples of such a device include an electric vehicle, a hybrid electric vehicle, and a power storage device.

That is, the secondary battery can be manufactured using the activation trays composed of the respective module trays. The secondary battery can be used as a unit battery of a battery pack including a plurality of batteries, which are used as a power source of a middle- or large-sized device requiring high temperature stability, long cycle characteristic, and high rate characteristic, and can also be used as a power source of a device including such a battery pack.

Specific examples of the device include an electric automobile including a mobile electronic device, a wearable electronic device, an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and an electric power storage device, but the present invention is not limited to these examples.

The remaining structure of the battery cell module-type activation tray and the secondary battery is well known in the related art, so a detailed description thereof will be omitted herein.

Advantageous Effects

As described above, the secondary battery cell module-type activation tray according to the present invention includes a first module tray, a second module tray, and a third module tray, and each of the module trays has a structure in which adjacent module trays extend in one direction or both directions in the plane so as to be coupled or detachable. As such, when a defective battery cell is found in any one module tray in the activation tray, the activation process can be performed in a state after removing only the specific module tray in which a defective battery cell was found, or the module tray may be combined with other module trays to continue the activation process, and thus it is possible to secure stability due to the prevention of activation of the defective cell. Further, when a defective battery is found, the related module tray can automatically remove the defective battery by the charge/discharge in the system, thereby resulting in a reduction in labor consumption.

DETAILED DESCRIPTION OF THE PREFERRED EMBODIMENTS

Hereinafter, the present invention will be described in detail with reference to the drawings according to the embodiments of the present invention, but the scope of the present invention is not limited thereto.

Figure 1:
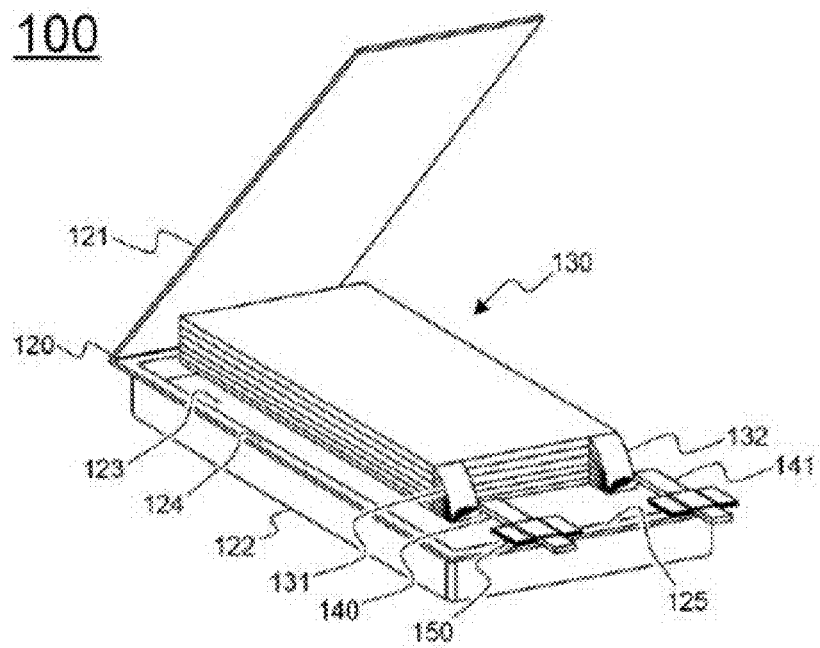
FIG. 1 is an exploded perspective view schematically showing the structure of a pouch-type battery cell.
Figure 2:
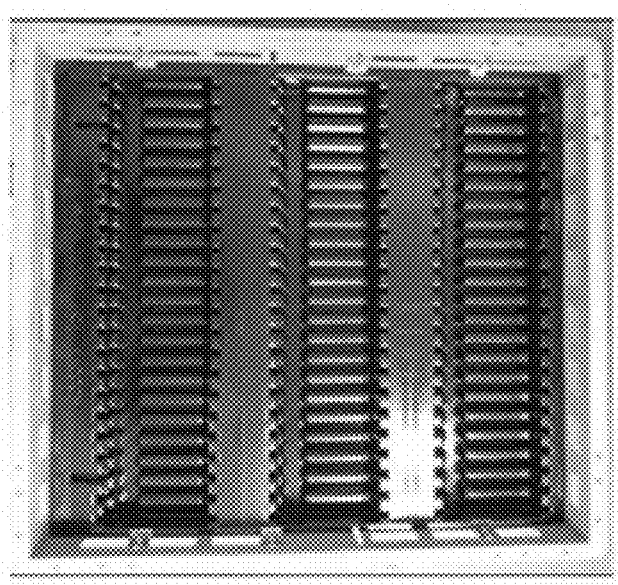
FIG. 2 is a photograph showing a conventional battery cell activation tray.
Figure 3:
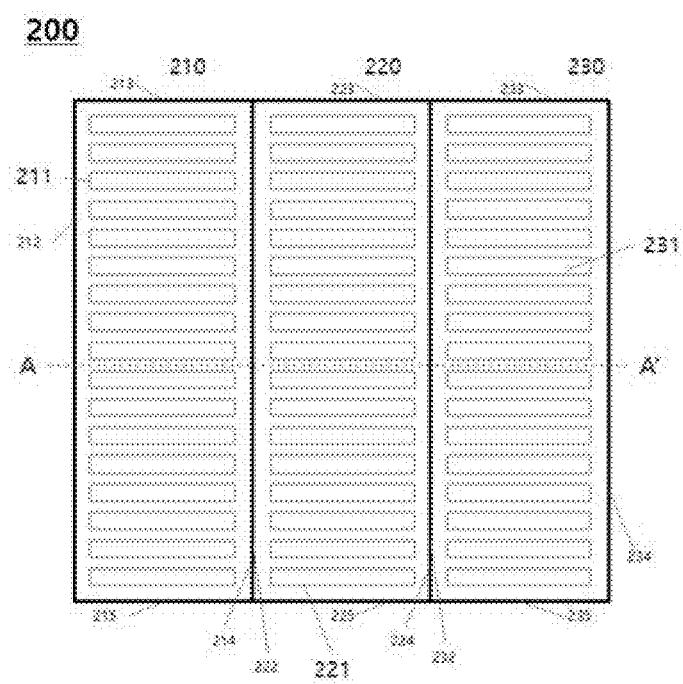
FIG. 3 is a plan view schematically illustrating the structure of a secondary battery cell module-type activation tray according to an embodiment of the present invention.

FIG. 3 is a plan view schematically illustrating the structure of a secondary battery cell module-type activation tray according to an embodiment of the present invention.

Referring to FIG. 3, the secondary battery cell module-type activation tray 200 includes a first module tray 210, a second module tray 220, and a third module tray 230.

In the first module tray 210, there is a battery cell 211 located in the first module tray. The battery cell 211 is embedded in one row of the first module tray 210 from one side, the first module tray being opened and accommodating a plurality of battery cells to the other side opposite thereto.

The battery cells 211, 221, and 231 are disposed in series in the module trays 210, 220, and 230 so that the lower surfaces of the electrode terminals face the ground. However, it is also possible that the lower surface of the electrode terminal faces the opposite direction of the ground.

Each of the module trays 210, 220, and 230 extends in one direction on a plane and extends through adjacent sidewalls. Each of the module trays includes a first sidewall, a second sidewall, a third sidewall and a fourth sidewall formed to extend along the outer periphery of the tray base plate, and the module tray can be assembled, joined and removed through the sidewalls.

More specifically, each of the module trays 210, 220, and 230 includes first sidewalls 212, 222 and 232, second sidewalls 213, 223 and 233, third sidewalls 214, 224 and 234, respectively, and the module trays 210, 220, and 230 are coupled through adjacent sidewalls. Referring to FIG. 3, the third sidewall 214 of the first module tray 210 is in contact with the first sidewall 222 of the second module tray 220, and third sidewall 224 of the second module tray 220 is in contact with the first sidewall 232 of the third module tray 230. Each module tray can be assembled/coupled or separated by forming a fastening structure in which the first sidewall and the third sidewall are mutually engageable.

Figure 4:
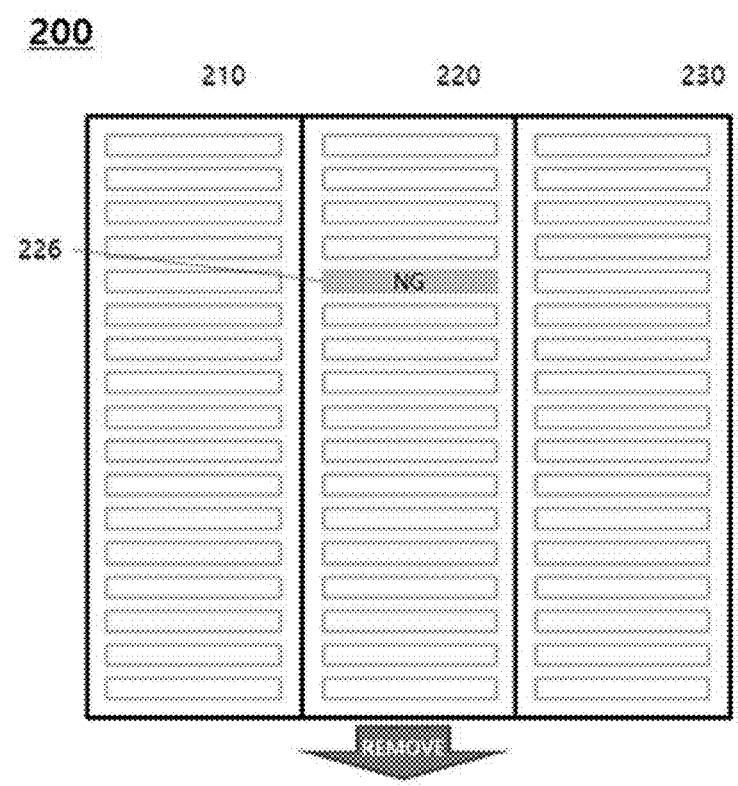
FIG. 4 is a plan view schematically illustrating the structure of a secondary battery cell module-type activation tray when a defective battery cell is found.
Figure 5:
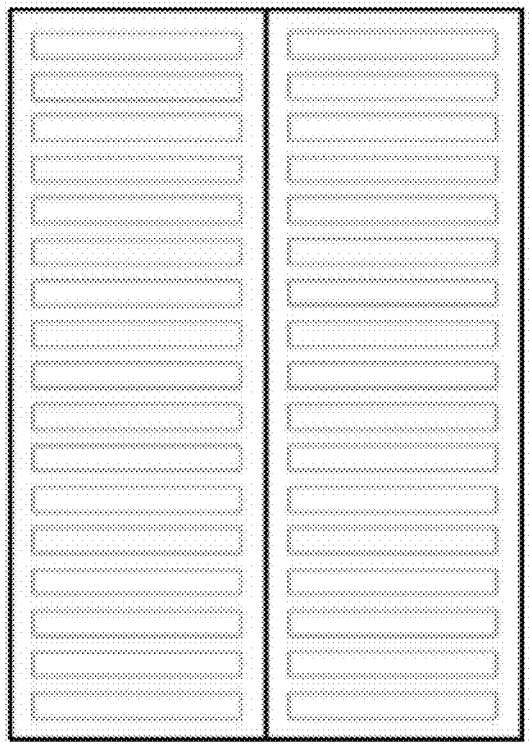
FIG. 5 is a plan view schematically illustrating the structure of a secondary battery cell module-type activation tray when a module tray, in which a defective battery cell is found, is removed.
Figure 6:
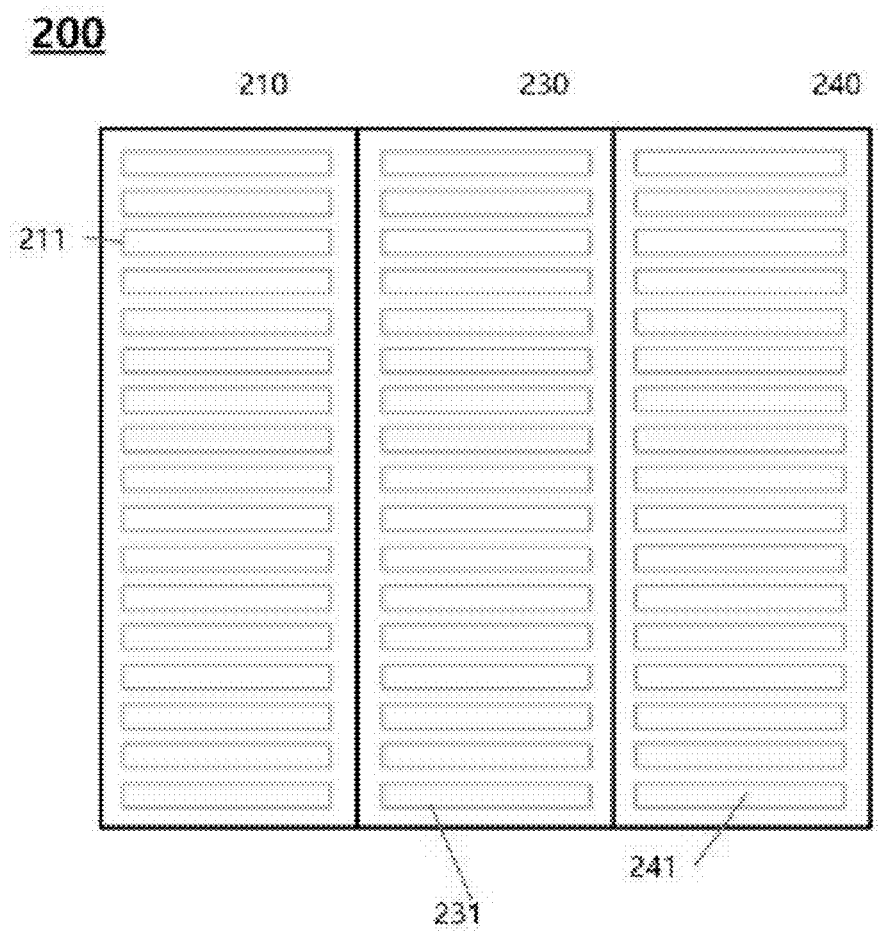
FIG. 6 is a plan view schematically illustrating the structure of a secondary battery cell module-type activation tray when an additional module tray is assembled.

FIG. 4 is a plan view schematically illustrating the structure of a secondary battery cell module-type activation tray when a defective battery cell is found, FIG. 5 is a plan view schematically illustrating the structure of a secondary battery cell module-type activation tray when a module tray, in which a defective battery cell is found, is removed, and FIG. 6 is a plan view schematically illustrating the structure of a secondary battery cell module-type activation tray when an additional module tray is assembled.

Referring to FIG. 4, when a defective battery cell 226 is found in the second module tray 220 in the battery cell module-type activation tray 200, the second module tray 220 including the defective battery cell is separated/removed. In this embodiment, although the defective battery cell 226 is generated only in the second module tray 220, it is possible to remove each module tray as generated in other trays, and the removed module tray may be preferably used again by inserting a general battery cell after removing a defective battery cell.

FIG. 5 illustrates a structure of a module-type activation tray where the first module tray 210 and the third module tray are assembled after the second module tray 220 is removed due to the defective battery cell 226 in FIG. 4. Further, FIG. 6 illustrates a structure in which the fourth module tray 240 is further assembled with the right side of the third module tray 230 in FIG. 5. In this embodiment, the fourth module tray 240, which is additionally introduced, is assembled on the side of the third module tray 230, but may also be assembled between the first module tray 210 and the third module tray 230.

In the embodiment of the present invention, it is illustrated that the battery cell module-type activation tray 200 is composed of two or three module trays. However, the present invention is not limited to this example. The battery cell module-type activation tray 200 may also be composed of 1 module tray or 4 or more module trays, but most preferably 3 or more module trays.

Figure 7:
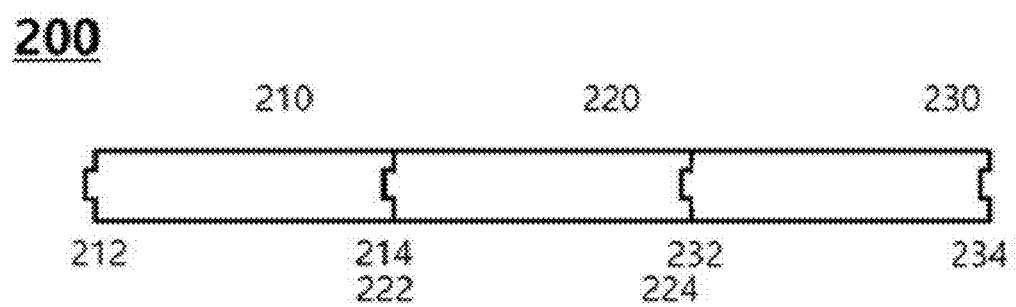
FIG. 7 is a schematic view schematically illustrating a side structure of a secondary battery cell module-type activation tray according to an embodiment of the present invention, which is a schematic view showing the inside of a cross-section taken along the line A-A' of FIG. 3.

FIG. 7 is a schematic view schematically illustrating a side structure of a secondary battery cell module-type activation tray according to an embodiment of the present invention, which is a schematic view showing the inside of a cross-section taken along the line A-A' of FIG. 3.

Referring to FIG. 7, the sidewalls of the respective module trays have a prefabricated fastening structure that can be coupled with each other. Specifically, a first sidewall forms a protrusion having a convex shape (凸) extending outwardly as a protrusion, and a third sidewall forms a groove having a concave shape (凹) extending outwardly as a groove, to thereby form a slide fastening structure in which adjacent module trays can be combined or separated.

In other words, the first sidewall 212 of the first module tray 210, the first sidewall 222 of the second module tray 220, and the third sidewall 232 of the third module tray 230 have a convex shape as a protrusion, but the third sidewall 214 of the first module tray 210, the third sidewall 224 of the second module tray 220, and the third sidewall 234 of the module tray 230 have a concave shape as groove.

That is, the first sidewalls 212, 222 and 232 of the module trays 210, 220 and 230 are in the form of projections and the third sidewalls 214, 224 and 234 are in the form of grooves. Therefore, the adjacent module trays can be slide-coupled according to the shape (凹凸), and respective module trays can be assembled, coupled, and separated.

Figure 8:
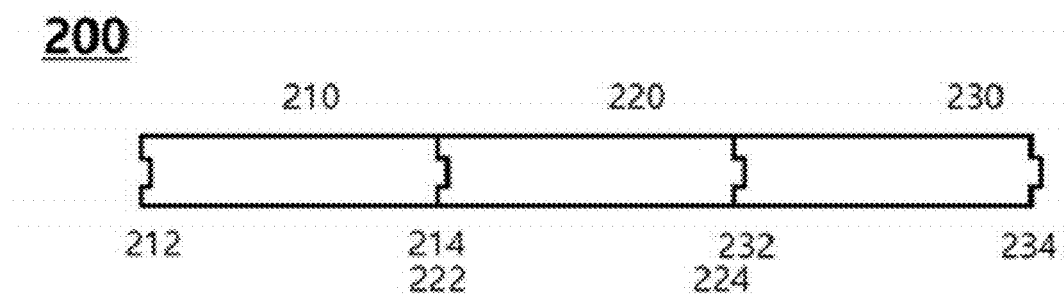
FIG. 8 is a view schematically illustrating the side structure of a secondary battery cell module-type activation tray according to another embodiment of the present invention.

Referring to FIG. 8, the sidewalls of the respective module trays have a prefabricated fastening structure that can be coupled with each other. Specifically, a first sidewall forms a groove having a concave shape extending outwardly, and a third sidewall forms a protrusion having a convex shape extending outwardly, to thereby form a slide fastening structure in which adjacent module trays can be combined or separated.

That is, the first sidewalls 212, 222 and 232 of the module trays 210, 220 and 230 are in the form of grooves and the third sidewalls 214, 224 and 234 are in the form of protrusions. Therefore, the adjacent module trays can be slide-coupled according to the shape (凹凸), and respective module trays can be assembled, coupled, and separated.

In the present embodiment, the first and third sidewalls are formed by protrusions and grooves, and the module trays are coupled and separated by a structure in which they can slide. However, the present invention is not limited thereto. If the sidewalls have a prefabricated fastening structure which can be mutually coupled, the assembly between module trays is possible.

Figure 9:
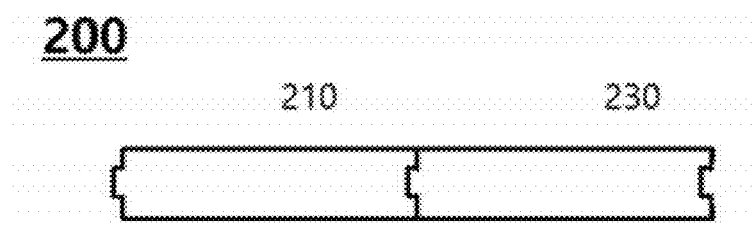
FIG. 9 is a view schematically illustrating the side structure of a secondary battery cell module-type activation tray when a module tray, in which a defective battery cell is found, is removed.

FIG. 9 is a side sectional view of FIG. 5 and shows a side structure in which the first module tray 210 and the third module tray 230 are connected adjacently after the second module tray 220 is removed due to the defective battery cell.

Figure 10:
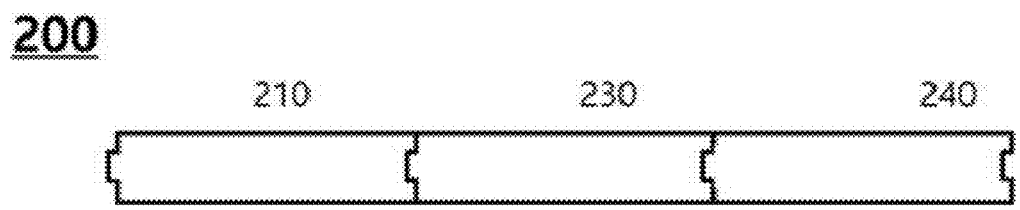
FIG. 10 is a view schematically illustrating the side structure of a secondary battery cell module-type activation tray when an additional module tray is assembled.

FIG. 10 is a sectional side view of FIG. 6 and shows a side structure in which the first module tray 210, the third module tray 230, and additionally the fourth module tray 240 are adjacently joined. In this embodiment, the fourth module tray 240, which is additionally introduced, is assembled on the side of the third module tray 230, but may also be assembled between the first module tray 210 and the third module tray 230.

The secondary battery cell module-type activation tray 200 according to the present invention configured as described above has a prefabricated fastening structure in which the sidewalls of the module trays can be coupled with each other, so that when a defective battery cell is found, it is not necessary to take out the entire tray, remove the defective cell, and reinsert it, and since only the module tray, in which the defective cell is found, can be removed, the efficiency of the activation process can be increased because the activation process can be continuously performed in the module tray in which defective cells are not found. In addition, since the module trays can be freely combined with each other, removal and assembling/coupling are facilitated, thereby reducing labor consumption.

The preferred embodiments of the secondary battery cell module-type activation tray according to the present invention have been described above.

The foregoing embodiments are to be considered in all respects as illustrative and not restrictive, and the scope of the invention is indicated by the appended claims rather than by the foregoing description. And all changes and modifications which come within the meaning and range of equivalency of the claims, as well as any equivalents thereof, are to be construed as being included within the scope of the present invention.

DESCRIPTION OF SYMBOLS

200: activation tray
210: first module tray
220: second module tray
230: third module tray
240: fourth module tray
211, 221, 231, 241: battery cell
212, 222, 232: first sidewall
213, 223, 233: second sidewall
214, 224, 234: third sidewall
215, 225, 235: fourth sidewall
226: defective battery cell

The invention claimed is:

1. A secondary battery cell module-type activation tray for transferring and charging a plurality of battery cells in a manufacturing process of a secondary battery, the activation tray comprising:
   a first module tray recessed from one surface opened to accommodate a plurality of the battery cells in a plurality of rows to another surface opposite thereto;
   a second module tray recessed from the one surface to accommodate a plurality of the battery cells in a plurality of rows to another surface opposite thereto; and
   a third module tray recessed from the one surface opened to accommodate a plurality of the battery cells in a plurality of rows to another surface opposite thereto,
   wherein each of the battery cells are disposed within a respective one of the module trays,
   wherein the first module tray, the second module tray, and the third module tray extend in one direction or multiple directions on a plane so as to be engageable or detachable with each other,
   wherein each of the first module tray, the second module tray and the third module tray comprises a first sidewall, a second sidewall, a third sidewall, and a fourth sidewall formed along an outer periphery of a tray bottom plate, and each of the first module tray, the second module tray and the third module tray is assembled through the respective first sidewall, the second sidewall, the third side wall and the fourth sidewall, and
   wherein each first sidewall forms a groove having a concave shape extending outwardly, and each third sidewall forms a protrusion having a convex shape extending outwardly, to thereby form a slide fastening structure in which adjacent module trays are engageable and separable.

2. A secondary battery cell module-type activation tray for transferring and charging a plurality of battery cells in a manufacturing process of a secondary battery, the activation tray comprising:
   a first module tray recessed from one surface opened to accommodate a plurality of the battery cells in a plurality of rows to another surface opposite thereto;
   a second module tray recessed from the one surface to accommodate a plurality of the battery cells in a plurality of rows to another surface opposite thereto; and
   a third module tray recessed from the one surface opened to accommodate a plurality of the battery cells in a plurality of rows to another surface opposite thereto,
   wherein each of the battery cells are disposed within a respective one of the module trays,
   wherein the first module tray, the second module tray, and the third module tray extend in one direction or multiple directions on a plane so as to be engageable or detachable with each other,
   wherein each of the first module tray, the second module tray and the third module tray comprises a first sidewall, a second sidewall, a third sidewall, and a fourth sidewall formed along an outer periphery of a tray bottom plate, and each of the first module tray, the second module tray and the third module tray is assembled through the respective first sidewall, the second sidewall, the third side wall and the fourth sidewall, and wherein each first sidewall forms a protrusion having a convex shape extending outwardly, and each third sidewall forms a groove having a concave shape extending outwardly, to thereby form a slide fastening structure in which adjacent module trays are engageable and separable.

\* \* \* \* \*